United States Patent
Lonn et al.

(10) Patent No.: US 6,230,089 B1
(45) Date of Patent: May 8, 2001

(54) TURF MAINTENANCE VEHICLE MULTIPLE CONTROLLER METHOD AND APPARATUS

(75) Inventors: Dana R. Lonn, Minneapolis; Eric Allen Metheny, Woodbury; James Robert Gaebel, Eden Prairie, all of MN (US)

(73) Assignee: The Toro Company, Minneapolis, MN (US)

( * ) Notice: Subject to any disclaimer, the term of this patent is extended or adjusted under 35 U.S.C. 154(b) by 0 days.

(21) Appl. No.: 08/757,397

(22) Filed: Nov. 27, 1996

Related U.S. Application Data

(63) Continuation-in-part of application No. 08/375,760, filed on Jan. 20, 1995, now Pat. No. 5,744,701, and a continuation-in-part of application No. 07/998,429, filed on Dec. 30, 1992, now Pat. No. 5,657,224, which is a continuation-in-part of application No. 07/816,816, filed on Jan. 3, 1992, now abandoned, which is a continuation-in-part of application No. 08/249,098, filed on May 23, 1994, now Pat. No. 5,394,678, which is a continuation of application No. 07/816,816, filed on Jan. 3, 1992, now abandoned.

(51) Int. Cl.⁷ ..................................................... G06F 11/30
(52) U.S. Cl. ................................. 701/48; 701/33; 701/36; 701/50
(58) Field of Search ................................. 701/48, 50, 36, 701/29, 33; 56/10.2 A, 10.2 E, 16.7, 6

(56) References Cited

U.S. PATENT DOCUMENTS

| | | |
|---|---|---|
| 1,768,446 | 6/1930 | Gron .................................. 200/94 R |
| 1,944,584 | 1/1934 | Stegeman et al. ......................... 56/7 |
| 2,253,260 | 8/1941 | Alcorn .............................. 200/84 R |
| 2,318,066 | 5/1943 | Dodd ...................................... 417/5 |
| 2,513,309 | 7/1950 | Grobowski et al. ................... 56/254 |

(List continued on next page.)

FOREIGN PATENT DOCUMENTS

| | | |
|---|---|---|
| 347458 | 8/1960 | (CH) . |
| 37 71 63 | 11/1990 | (EP) . |
| 2075684 | 10/1971 | (FR) . |
| 2178669 | 11/1973 | (FR) . |
| 28903 | 12/1912 | (GB) . |

(List continued on next page.)

OTHER PUBLICATIONS

Reelmaster® 223–D Operator's Manual (1991).
Reelmaster® 223–D Brochure (1990).
Stone, M. et al., "ISO 11783: An Electronic Communications Protocol for Agricultural Equipment", *ASAE Distinguished Lecture Series*, 23: 1–17 (Feb. 1999).

*Primary Examiner*—William A. Cuchlinski, Jr.
*Assistant Examiner*—Arthur D. Donnelly
(74) *Attorney, Agent, or Firm*—Merchant & Gould P.C.

(57) ABSTRACT

A system for communicating between a plurality of electronic control units (ECU's) located on-board a turf maintenance system is provided. The controllers are connected by a common bus network. When the ECU's boot up a primary controller sends a message out on the bus requesting a response if any secondary controllers are connected to the bus. The secondary controllers are programmed to listen for the request, to generate a message to identify itself, and to transmit the requested message to identify itself over the bus. The primary controller waits for a predetermined time to receive and identify the secondary controller message. The primary controller then polls for additional secondary controllers in a similar manner. Accordingly, the primary controller sequentially determines whether additional controllers are connected to the bus. Once the initial list of ECU's is built, the primary controller moves into a main program loop, including routines to exchange information with each of the secondary controllers which identified themselves during the polling process.

15 Claims, 10 Drawing Sheets

U.S. PATENT DOCUMENTS

| | | | |
|---|---|---|---|
| 2,523,014 | 9/1950 | Gooch | 56/10.6 |
| 2,588,002 | 3/1952 | Holmes | 56/10.7 |
| 2,604,522 | 7/1952 | Monroe | 73/308 |
| 2,625,042 | 1/1953 | Binford | 73/299 |
| 2,825,895 | 3/1958 | Malagarie | 340/450.1 |
| 2,869,309 | 1/1959 | Benson | 56/249 |
| 3,093,946 | 6/1963 | Pitt et al. | 460/6 |
| 3,098,574 | 7/1963 | De Marco | 414/635 |
| 3,152,478 | 10/1964 | Hughes et al. | 73/308 |
| 3,177,638 | 4/1965 | Johnson | 56/7 |
| 3,207,244 | 9/1965 | Becker et al. | 180/6.48 |
| 3,303,785 | 2/1967 | Pearce | 417/36 |
| 3,401,764 | 9/1968 | Schafer | 180/305 |
| 3,410,063 | 11/1968 | Speiser | 56/7 |
| 3,429,110 | 2/1969 | Strasel | 56/7 |
| 3,438,247 | 4/1969 | Lotti et al. | 73/40 |
| 3,442,068 | 5/1969 | Bulin | 460/6 |
| 3,442,070 | 5/1969 | Batog | 56/11.1 |
| 3,478,688 | 11/1969 | Lind | 417/36 |
| 3,514,929 | 6/1970 | Cornish et al. | 460/6 |
| 3,538,745 | 11/1970 | Wright et al. | 73/305 |
| 3,568,705 | 3/1971 | Boyadjieff | 137/87.04 |
| 3,576,959 | 5/1971 | Bogosoff | 200/84 C |
| 3,589,109 | 6/1971 | Payne | 56/10.2 R |
| 3,667,605 | 6/1972 | Zielinski | 210/170 |
| 3,673,587 | 6/1972 | Baruch | 340/450 |
| 3,685,531 | 8/1972 | Byford | 137/101.11 |
| 3,708,245 | 1/1973 | King | 417/13 |
| 3,726,070 | 4/1973 | Klosterman et al. | 56/294 |
| 3,742,685 | 7/1973 | Lian et al. | 56/7 |
| 3,758,967 | 9/1973 | Thompson | 37/242 |
| 3,816,985 | 6/1974 | Sorenson et al. | 56/7 |
| 3,854,271 | 12/1974 | Aldred | 56/7 |
| 3,968,630 | 7/1976 | Mitchell | 220/86.4 |
| 3,973,379 | 8/1976 | Ecker et al. | 56/11.9 |
| 3,999,359 | 12/1976 | Jordan et al. | 56/27.5 |
| 4,020,481 | 4/1977 | Nakagawa | 340/624 |
| 4,057,700 | 11/1977 | Nakashima | 200/84 C |
| 4,090,396 | 5/1978 | O'Brien | 73/46 |
| 4,152,925 | 5/1979 | Lindh | 73/40.5 R |
| 4,161,957 | 7/1979 | Schoellkopf | 137/205 |
| 4,188,722 | 2/1980 | Jorden et al. | 30/168 |
| 4,192,124 | 3/1980 | Balthes | 56/27.5 |
| 4,258,421 | 3/1981 | Juhasz et al. | 701/35 |
| 4,271,402 | 6/1981 | Kastura et al. | 340/459 |
| 4,274,328 | 6/1981 | Pedersen | 91/445 |
| 4,296,409 | 10/1981 | Whitaker et al. | 340/684 |
| 4,321,590 | 3/1982 | Ishikawa et al. | 340/515 |
| 4,325,894 | 4/1982 | Date et al. | 261/66 |
| 4,327,544 | 5/1982 | Mcduffre et al. | 460/1 |
| 4,332,127 | 6/1982 | Staiert et al. | 460/3 |
| 4,353,245 | 10/1982 | Nicolai | 73/49.2 |
| 4,361,835 | 11/1982 | Nagy . | |
| 4,376,298 | 3/1983 | Sokol et al. | 701/34 |
| 4,380,243 | 4/1983 | Braley | 137/312 |
| 4,398,186 | 8/1983 | Statz | 340/616 |
| 4,430,846 | 2/1984 | Presely et al. | 56/10.2 G |
| 4,440,017 | 4/1984 | Barton et al. | 73/40.5 R |
| 4,480,610 | 11/1984 | Stinson | 123/196 S |
| 4,487,002 | 12/1984 | Kruse et al. | 460/6 |
| 4,505,148 | 3/1985 | Zajac | 73/49.2 |
| 4,513,774 | 4/1985 | Reid | 137/392 |
| 4,522,109 | 6/1985 | Marchi et al. | 91/420 |
| 4,522,167 | 6/1985 | Hurner | 123/196 S |
| 4,527,241 | 7/1985 | Sheehan et al. | 701/50 |
| 4,549,429 | 10/1985 | Kurt | 73/40 |
| 4,551,801 | 11/1985 | Sokol | 701/32 |
| 4,563,674 | 1/1986 | Kobayashi | 340/620 |
| 4,571,987 | 2/1986 | Horner | 73/49.2 |
| 4,590,462 | 5/1986 | Moorehead . | |
| 4,591,837 | 5/1986 | Marinez | 340/605 |
| 4,604,893 | 8/1986 | Senese et al. | 73/49.2 |
| 4,608,638 | 8/1986 | Tsikos | 701/35 |
| 4,610,165 | 9/1986 | Duffy et al. | 73/317 |
| 4,611,620 | 9/1986 | Wang | 137/100 |
| 4,616,328 | 10/1986 | Kassay | 395/500.28 |
| 4,637,254 | 1/1987 | Dyben et al. | 73/314 |
| 4,710,757 | 12/1987 | Haase | 340/684 |
| 4,732,035 | 3/1988 | Lagergren et al. | 73/49.2 |
| 4,750,775 | 6/1988 | Miller | 296/38 |
| 4,773,265 | 9/1988 | Baillie et al. | 73/305 |
| 4,775,855 | 10/1988 | Cox | 340/605 |
| 4,781,057 | 11/1988 | Hyfantis, Jr. et al. | 73/49.2 |
| 4,794,548 | 12/1988 | Lynch et al. | 702/188 |
| 4,796,469 | 1/1989 | Brown et al. | 73/49.2 |
| 4,804,944 | 2/1989 | Golladay et al. | 340/624 |
| 4,811,601 | 3/1989 | Tolan | 73/290 B |
| 4,827,762 | 5/1989 | Hasselmann | 73/49.2 |
| 4,848,150 | 7/1989 | Baird et al. | 73/296 |
| 4,852,054 | 7/1989 | Mastandrea | 702/51 |
| 4,853,856 | 8/1989 | Hanway | 701/35 |
| 4,878,338 | 11/1989 | Aldred et al. | 56/7 |
| 4,926,331 | 5/1990 | Windle et al. | 701/35 |
| 4,961,064 | 10/1990 | Hara | 338/231 |
| 4,967,544 | 11/1990 | Ziegler et al. | 56/10.2 R |
| 4,987,769 | 1/1991 | Peacock et al. | 73/49.7 |
| 5,000,044 | 3/1991 | Doffey et al. | 73/317 |
| 5,021,665 | 6/1991 | Ames | 250/357.1 |
| 5,035,141 | 7/1991 | Baird et al. | 73/296 |
| 5,042,236 | 8/1991 | Lamusga et al. | 56/7 |
| 5,046,007 | 9/1991 | McCrery et al. | 701/35 |
| 5,107,699 | 4/1992 | Mastandrea | 73/49.2 |
| 5,156,042 | 10/1992 | Carlin et al. | 73/49.2 |
| 5,173,856 | 12/1992 | Purnell et al. | 701/35 |
| 5,185,700 | 2/1993 | Bezos et al. | 701/35 |
| 5,187,973 | 2/1993 | Kunze et al. | 73/40.5 R |
| 5,195,612 | 3/1993 | Hahn et al. | 184/6.4 |
| 5,196,824 | 3/1993 | Helm | 340/450.3 |
| 5,254,976 | 10/1993 | Schueler | 340/605 |
| 5,255,208 | 10/1993 | Thakore et al. | 702/185 |
| 5,260,875 | * 11/1993 | Tofte et al. | 701/50 |
| 5,315,529 | 5/1994 | Farmer | 702/51 |
| 5,394,678 | 3/1995 | Lonn et al. | 250/577 |
| 5,402,110 | 3/1995 | Oliver et al. | 56/10.24 |
| 5,421,193 | 6/1995 | Carlin et al. | 340/605 |
| 5,565,687 | 10/1996 | Berrill | 73/49.2 |
| 5,657,224 | 8/1997 | Lonn et al. | 701/29 |
| 5,744,701 | 4/1998 | Peterson et al. | 73/49.2 |

FOREIGN PATENT DOCUMENTS

| | | |
|---|---|---|
| 315568 | 7/1928 | (GB) . |
| 424031 | 2/1935 | (GB) . |
| 1375827 | 11/1974 | (GB) . |
| 2003723 | 9/1978 | (GB) . |
| 399367 | 10/1942 | (IT) . |
| 5448218 | 11/1980 | (JP) . |
| 58-198726 | 6/1982 | (JP) . |
| WO 377163 | 7/1990 | (WO) . |

* cited by examiner

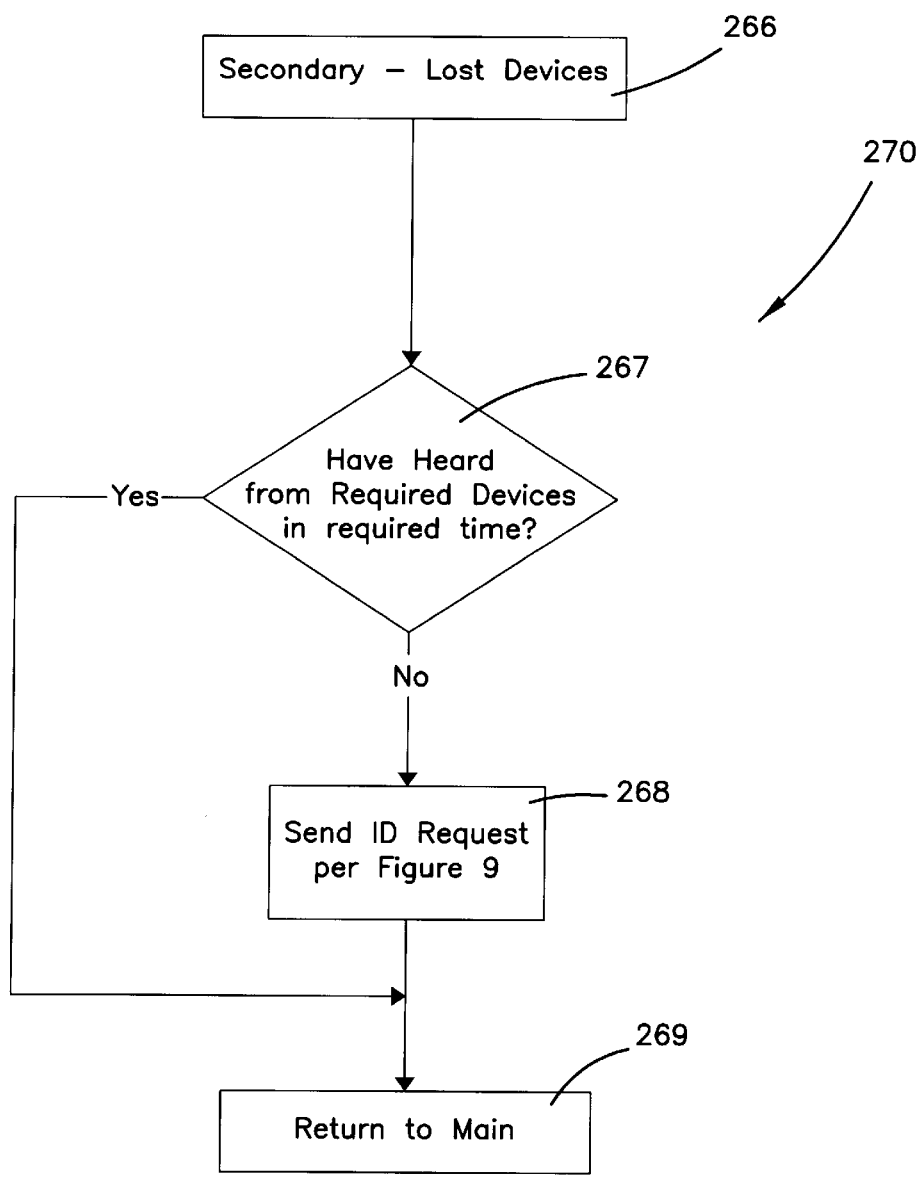

TURF MAINTENANCE VEHICLE MULTIPLE CONTROLLER METHOD AND APPARATUS

RELATED APPLICATIONS

This application is a continuation-in-part of the application titled "Electronic Liquid Level Detector", Ser. No. 08/375,760 filed Jan. 20, 1995, by Lonn et al. now U.S. Pat. No. 5,744,701. This application is also a continuation-in-part of the application titled "Turf Maintenance Vehicle Diagnostics and Parameter Condition Logger", Ser. No. 07/998,429 filed Dec. 30, 1992, by Lonn et al; now issued as U.S. Pat. No. 5,657,224; which is a continuation-in-part of application titled "Electronic Control for Turf Maintenance Vehicle", Ser. No. 07/816,816 filed Jan. 3, 1992, abandoned May 23, 1994, which is a CIP of U.S. application, Ser. No. 08/249,098, filed May 23, 1994, issued as U.S. Pat. No. 5,394,678 was also a continuation of Ser. No. 07/816,816.

FIELD OF THE INVENTION

The present invention relates to a turf maintenance vehicle; more particularly to a communication scheme between a plurality of electronic controllers located on a turf maintenance vehicle; and more particularly still to a method and apparatus for automatically determining whether optional electronic controllers are present on a turf maintenance vehicle in order to communicate information between the various controllers.

BACKGROUND OF THE INVENTION

In the past, turf maintenance vehicles generally employed mechanical systems to control the vehicle's various cutting functions, engine functions, etc. However, as electronic controllers have become more robust and sophisticated, it has been recognized that the control of a turf maintenance vehicle's various systems can be enhanced by utilizing electronic controllers. Accordingly, various electronic controllers have been utilized to monitor and/or control various functions on turf maintenance vehicles.

A first example of such a vehicle utilizing an electronic controller is U.S. Pat. No. 5,394,678 titled "Electronic Control for Turf Maintenance Vehicle" issued to Lonn et al and assigned to The Toro Company (the assignee of the present invention). This patent generally discloses use of an electronic controller for maintaining a predetermined cutting "clip" at varying ground speeds, heights of cut, and other changed conditions for a turf maintenance vehicle.

A second example of an electronic controller used on a turf maintenance vehicle is disclosed in U.S. Pat. No. 5,497,604, issued to Lonn et al and assigned to The Toro Company (the assignee of the present invention). This patent generally illustrates use of an electronic controller device to implement a "supervisor switch" for a turf maintenance vehicle. The switch automatically provides for maintaining an acceptable ground speed during cutting operations of a turf mower.

A third example which utilizes an electronic controller is disclosed in U.S. patent application Ser. No. 08/375,760 entitled "Electronic Liquid Level Detector", filed Jan. 20, 1995 to Lonn et al and assigned to The Toro Company (the assignee of the present invention). This application generally discloses a hydraulic fluid level detector. An electronic controller is used in connection with a measuring device for determining changes in the volume of hydraulic fluid in a reservoir of the type utilized on a turf maintenance vehicle. The processor monitors changes in volume in order to determine whether a leak condition exists (i.e., whether hydraulic fluid is escaping the reservoir).

In each of the foregoing examples (the disclosures of which are hereby incorporated herein by reference and made a part hereof), the electronic controller utilizes a plurality of inputs and outputs to monitor the various conditions, to process the information, and to provide output to regulate the process and/or to warn the operator of improper conditions. It will be appreciated by those skilled in the art that, in many instances, it is beneficial for controllers located on the same turf vehicle to share information (either inputs, computed outputs, or error conditions).

Generally in the past, a single electronic controller was utilized to perform several functions. In these instances, however, reprogramming was required for the single processor to perform the various control functions. Alternatively, a different software program was required to be loaded into the controller—based on the other optional controller based devices located on board the turf maintenance vehicle and/or additional features. Both of these approaches, however, constituted a "fixed electronics architecture." Although such an approach may be implemented, this type of architecture has several drawbacks.

First, the issue of programmability discussed above creates drawbacks since a "fixed" program device is not compatible with normal product enhancement processes. By way of example, improvements are not easy to implement with these devices because often the electronic hardware must be replaced. Additionally, if non-interchangeable enhancements are implemented, then backward compatibility for service may be a problem.

Second, with this type of architecture it is difficult to determine the correct processor size from a commercial standpoint for any given electronic controller application (e.g., from a cost and upward enhancement standpoint). For example, if the controller is optimized for one application, then that controller may have more or less capability than is needed for the next application or enhancement. This creates a problem during the design process since the electronic controller must initially be designed with excess capacity. The alternative is to eliminate the excess capacity at the expense of limiting functionality or upward enhancements.

Third, it is oftentimes desirable to have the ability to share information among the various intelligent electronic processor devices located on-board. Over time, the ability to communicate may afford a reduction in costs (e.g., elimination of redundant sensor devices) and may promote further integrating on-board systems.

Therefore, there exists a need in the art to develop a system wherein the various electronic controller devices located on a turf maintenance vehicle are connected to a common bus, automatically polled to determine which controllers are present/operative, recorded by building a list of the various responding controllers connected to the bus, and connected to exchange information. The present invention directly addresses and overcomes the shortcomings of the prior art.

SUMMARY OF THE INVENTION

The present invention provides a method and apparatus for automatically determining which electronic controller devices are connected to a communication bus on-board a turf maintenance vehicle. Once the controllers are determined, the present invention builds a list in memory and operates in a manner wherein information is shared between the controllers.

In a preferred embodiment constructed according to the principles of the present invention, there is provided a plurality of electronic control units (ECU's) located on-board a turf maintenance vehicle. The controllers are connected by a common bus network. Two types of ECU's are utilized in the preferred embodiment. The ECU's preferably utilize similar or identical hardware, although different software is used in the two types of ECU's. The invention includes one primary (supervisory) ECU and may include one or more secondary (slave) ECU's. The primary controller generally has the majority of the information, while the secondary controller(s) supports the primary and may act essentially as an expansion module to the primary controller.

It will be appreciated that the terms primary and secondary (and supervisory-slave) are used herein merely to identify the different controllers. In the preferred embodiment, the communication code between the two types of ECU's is similar—with message ID's differing. Each of the secondary controllers are generally active devices which control various functions and features (although controllers for passive uses may also be connected to the bus, e.g., the leak detector device described further below). Therefore, while the primary and secondary controllers share information to operate more efficiently, the primary controller does not necessarily dictate, control, or otherwise supervise the operation of the secondary controller(s).

In operation, when the ECU's boot up the primary controller sends a message out on the bus requesting a response if a secondary controller is also connected to the bus. The secondary controller is programmed to listen for the request, to generate a message to identify itself, and to transmit the requested message to identify itself over the bus. The primary controller waits for a predetermined time to receive and identify the secondary controller message. The primary controller then polls for additional secondary controllers in a similar manner. Accordingly, the primary controller determines whether additional controllers are connected to the bus. Each of the secondary controllers is programmed to respond to the request to identify itself. Once the initial list of ECU's is built, the primary controller can then optionally print out the responses it receives from the polling process to an output device (e.g., via a serial port). This information can then be used for diagnostics purposes, among others. After the polling sequence, the primary controller moves into a main program loop, including routines to exchange information with each of the secondary controllers which identified themselves during the polling process. If expected information is not received, then the preferred embodiment provides for re-polling the bus to determine if the controllers are still connected and operative.

Therefore, according to one aspect of the invention, there is provided a method of networking a plurality of processors on a turf maintenance vehicle comprising the steps of: connecting a primary controller to one or more secondary controllers via a bus; polling the secondary controllers to determine if they are connected to a bus; determining if the secondary controllers respond; and passing information between the primary and secondary controllers that respond.

According to a further aspect of the invention, there is provided a method comprising the steps of the preceding paragraph, and wherein the passing information step is periodically repeated.

While the invention will be described with respect to a preferred embodiment configuration with respect to particular circuit components used therein, it will be understood that the invention is not to be construed as limited in any manner by either such circuit configurations or circuit components described herein. Further, while the preferred embodiment of the invention will be described in relation to a turf mower, it will be understood that the invention may be utilized in connection with a number of turf maintenance vehicles and mowers. The principles of this invention apply to the detection of primary and secondary ECU's connected to a bus on a turf maintenance vehicle so as to automatically provide an indication of the controller devices located on-board, and for subsequent exchange of information. These and other variations of the invention will become apparent to those skilled in the art upon a more detailed description of the invention.

The various advantages and features which characterize the invention are pointed out with particularity in the claims annexed hereto and forming a part hereof. However, for a better understanding of the invention, its advantages and objectives obtained by its use, reference should be had to the drawing which forms a further part hereof and to the accompanying descriptive matter, in which there is illustrated and described a preferred embodiment to the invention.

BRIEF DESCRIPTION OF THE DRAWING

Referring to the drawing, wherein like numerals represent like parts throughout the several views:

FIGS. 8a and 8b are logic flow diagrams of a software program implementing the programming steps utilized by the primary controller 100 and secondary controller 150 respectively when there is a lost device on the CAN.

DETAILED DESCRIPTION OF THE PREFERRED EMBODIMENT

As mentioned above, the principles of this invention apply to the automatic detection of ECU's connected to a bus on a turf maintenance vehicle. Once the ECU's are detected by a primary controller and a list is built, the controllers (which are present) can communicate with each other to exchange information in order to operate more effectively. A preferred application of this invention is in the monitoring and exchanging information in a turf maintenance vehicle. An example of such a vehicle is a commercial reel mower, however, such example is typical of only one of innumerable types of turf maintenance vehicles in which the principles of the present invention can be employed.

In order to better present and describe the preferred embodiment of the present invention, a detailed description of the multiple controller architecture network will be deferred pending discussions of a preferred embodiment turf mower on which the present invention might be used, a preferred exemplary primary controller 100, and a preferred exemplary secondary controller 150.

Turf Mower 10

Figure 1:
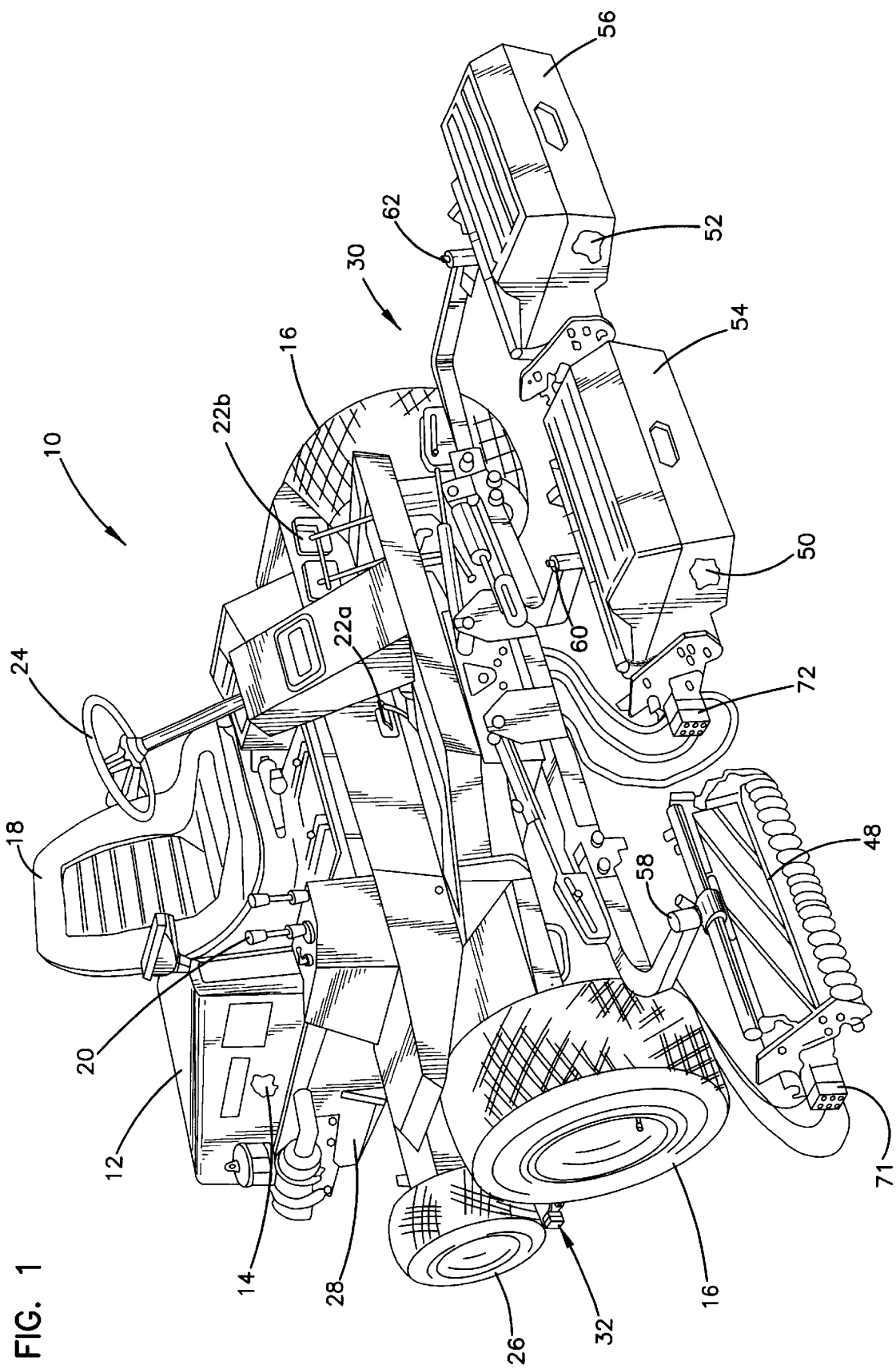
FIG. 1 is a perspective view of a commercial reel mower 10 in which environment a preferred embodiment of the present invention may be practiced.

Referring first to FIG. 1, there is shown a typical commercial riding reel mower 10 with which the present invention may be used. Such mowers are typically utilized for cutting large areas such as golf courses, football fields, parks and the like. The mower 10 includes a rear housing 12 enclosing an engine compartment 14 which is hydraulically coupled via a transmission to a pair of front driving or traction wheels 16. The operator sits in a seat 18 positioned in front of the engine housing 12 and controls operation of the mower 10 by means of hand controls 20, foot controls 22a, 22b and a steering wheel 24 which is cooperatively connected to a pair of rear steering wheels 26, only one of which is shown. The rear steering wheels 26 are of relatively smaller diameter and tread than the front traction wheels 16, for purposes of better maneuverability.

Still referring to FIG. 1, the mower 10 includes a frame 28 having a forward projecting platform on which the foot controls 22a, 22b and pedestal for steering wheel 24 are mounted. A front lift arm assembly 30 is mounted on the front end of frame 28 between the front wheels 16, while a rear lift arm assembly 32 is mounted on the frame between the front wheels 16 and the rear wheels 26. The lift arm assemblies 30 and 32 include cutting reels mounted on pivotal lift arms that are normally biased by adjustable spring assemblies downwardly into contact with the turf. Hydraulic cylinders operate to raise and lower the lift arms between their extreme positions. The operation of the lift arm assemblies is discussed more fully in U.S. Pat. No. 5,042,236, which is hereby incorporated herein by reference.

Cutting reels are mounted on the outer end of each of the lift arms of the front lift arm assembly 30. More particularly, cutting reel 48 is secured to the outer end of the right outboard lift arm 58, cutting reel 50 is secured to the outer end of the middle lift arm 60, and cutting reel 52 is mounted on the outer end of the left outboard lift arm 62. Each of the cutting reels 48, 50 and 52 is of substantially conventional construction, including hydraulically driven transverse blades positioned between front and rear transverse rollers. Such cutting reels 48, 50 and 52 are usually enclosed by grass shields and baskets, only two of which shields/baskets 54 and 56 are shown in FIG. 1 for the purposes of clarity. Each of the cutting reels move past a bedknife (not shown). Hereinafter, the reels will be described by the designation 48 for clarity.

The mower also includes a rear lift arm assembly 32 which is mounted on the lower frame 28 between the front wheels 16 and the rear wheels 26. The rear lift arm assembly 32 includes two lift arms (not shown) which are supported and biased downwardly by hydraulic actuators and adjustable spring assemblies respectively similar to those in front lift arm assembly 30. Hydraulic motors drive the reels 48. While only two motors 71 and 72 are shown in FIG. 1, it will be appreciated that additional motors are provided for the other cutting reels 48.

Primary Controller 100

Figure 3:
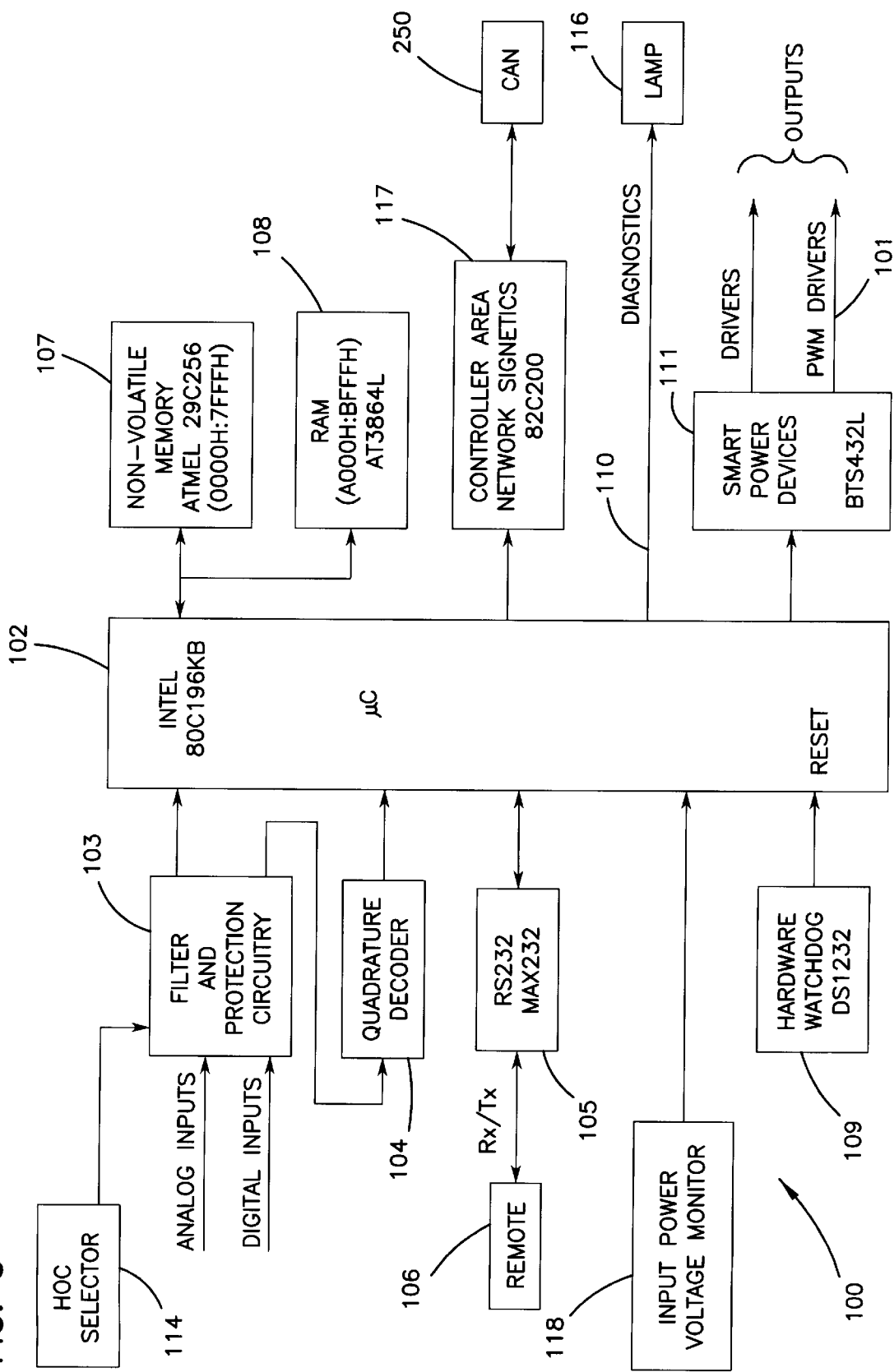
FIG. 3 is a functional block diagram illustrating the electronic components comprising a preferred embodiment primary controller 100.

Next, referring to FIG. 3, primary (supervisory) controller 100 is illustrated with certain inputs provided to the processor 102. For example, the primary controller 100 receives input signals from input block 103 (also via quadrature block 104) which includes proper buffers, A/D devices, etc. The input signals are originally generated by switches and encoder devices, such as optical encoders, Hall effect devices, etc. Other input signals include input from the height of cut selector block 114. By utilizing the various inputs, the reel-speed, ground-speed, etc. are determined and provided to microprocessor block 102.

Still referring to FIG. 3, RS-232 interface block 105 provides a two-way communication port to remote microprocessor 106 for diagnostics, testing, providing field programming for loading the maximum mowing speed, the application code, system configuration data and the like. More specifically, a remote computer 106 may be utilized to provide field-loaded software instructions to reside in nonvolatile memory block 107 and to implement and/or change the predetermined maximum cutting speed.

Input power voltage monitor block 118 provides power to microprocessor block 102 and other electrical components. Hardware watchdog block 109 provides a reset function for the primary controller 100.

In the preferred embodiment, the processor 102 may be of the type manufactured by Intel having a model designation 80C196KB. The processor 102 is preferably a 16 bit microcontroller. Included with processor 102 is nonvolatile memory block 107 and random access memory block 108. In the preferred embodiment, primary controller 100 is comprised of blocks 102, 103, 104, 105, 107, 108, 109, 111, 117 and 118. It will be appreciated by those skilled in the art, however, that other functional blocks may make up the primary controller 100 and maintain the functionality of the device.

Output is provided to an operator perceptible indicia device 116 via line 110 (or other indicia via block 111), such as an out of range lamp preferably located in a position easily visible to an operator in order to notify the operator of a fault condition in the clip control, to warn the operator that the maximum mowing speed is being approached and/or exceeded, or that a hydraulic fluid leak is occurring. Those skilled in the art will appreciate that buzzers, horns, vibration devices, etc. might also be used in addition to or separately from the preferred lamp illustrated in FIG. 3. It will also be appreciated that reverse logic might be used in activating the operator perceptible indicia such that the light, horn, etc. could be turned "off," rather than being turned "on" when a condition occurs. Therefore, while the operator perceptible indicia is discussed herein as being energized, those skilled in the art will appreciate that negative logic (to turn the indicia off) is to be included in such language. Also, several indicia might be used.

Output devices block 111 preferably includes several drivers and several high speed pulse width modulated drivers. These drivers provide for, by way of example, controlling the reel speed in a manner related to the measured ground speed during mowing operations in order to optimize the clip to enable the reels 48 if the maximum mowing speed is not exceeded and to energize the prime mover coil, among others. The controller 100 preferably utilizes a feedback control loop to maintain the actual reel speed at a target speed. The operation of primary controller 100 and the feedback control loop is described in more detail in U.S. Pat. No. 5,394,678 issued to Lonn et al, incorporated by reference above.

While not specifically detailed in FIG. 3 (or in FIG. 4 discussed further below), it will be understood that the primary and secondary ECU's include various logic gates, flip-flops, etc., and must be properly connected to appropriate bias and reference supplies so as to operate in their intended manner. Similarly, it will be understood that appropriate memory, clock oscillator, buffer and other attendant peripheral devices are to be properly connected to the primary and secondary ECU's so as to operate in their intended manner.

The logical operation and software routines of the primary controller 100 will be deferred pending discussion of the exemplary secondary controller 150.

Leak Detector Controller 150a

Figure 2:
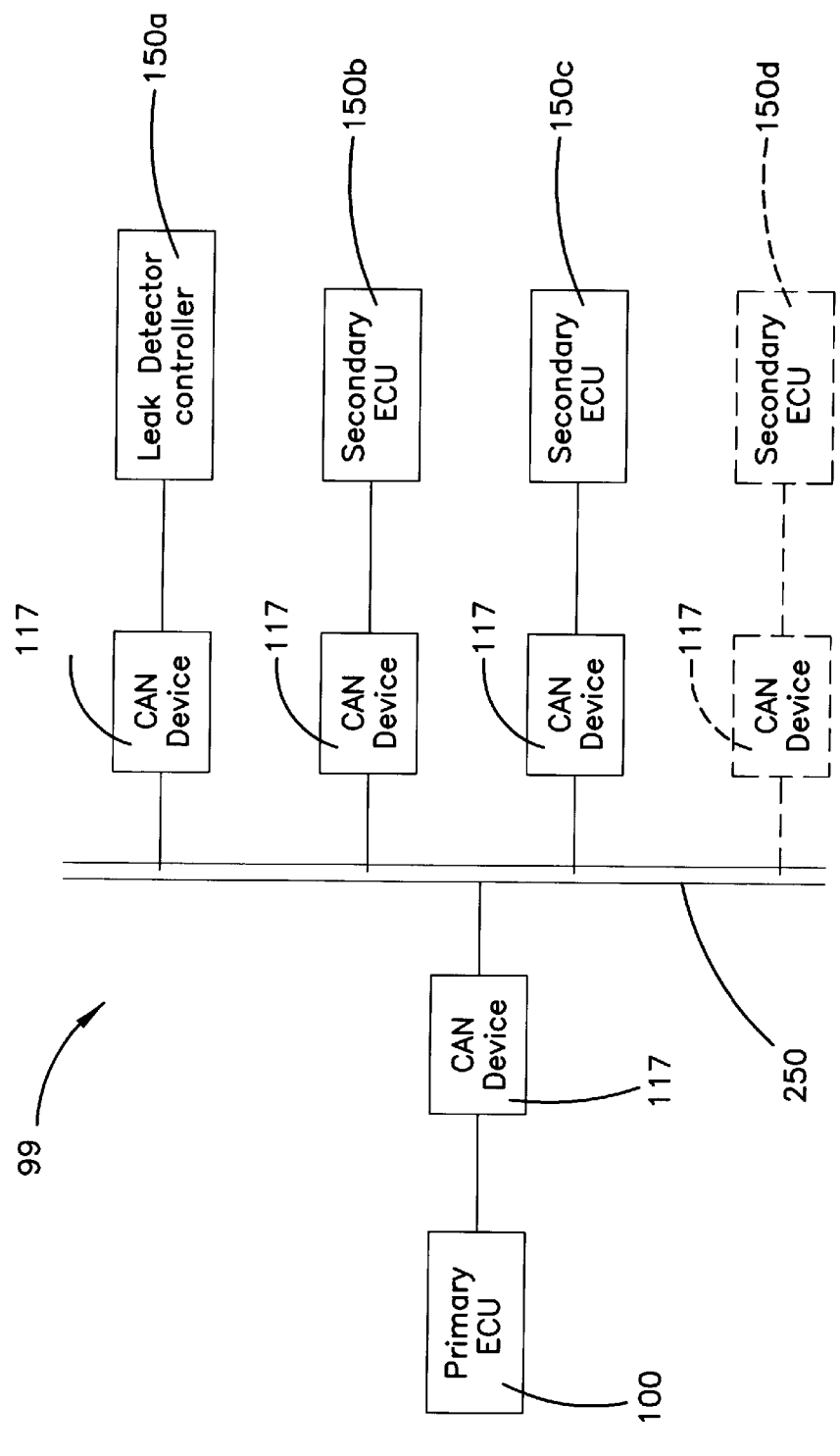
FIG. 2 is a block diagram illustrating a plurality of electronic control units (ECU's) connected to a common bus 250 to form a controller area network (CAN)
Figure 4:
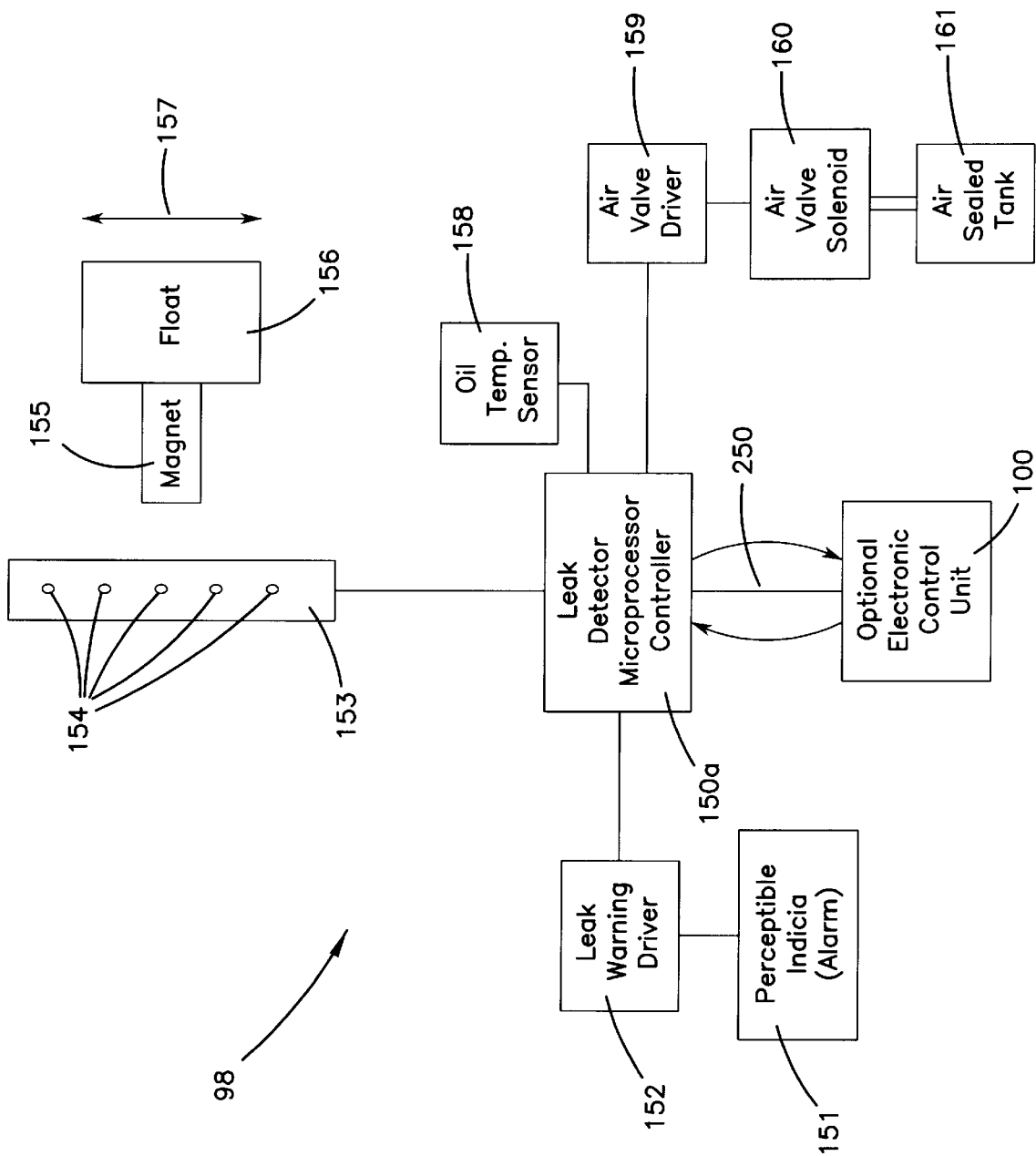
FIG. 4 is a functional block diagram illustrating various functional blocks of an electronic liquid level detector which includes an exemplary secondary controller 150.

The leak detector controller 150a of the hydraulic fluid leak detector 98 illustrated in FIG. 4 is exemplary of the family of secondary electronic controllers 150 shown in FIG. 2. The hydraulic fluid leak detector is described in more detail in the U.S. Application "Electronic Liquid Level Detector" (Ser. No. 08/375,760) incorporated by reference above. However, a brief description of the leak detector controller 150a is next provided.

The leak detector microprocessor based controller block 150a is connected to a printed circuit board 153 having a plurality of Hall effect sensors 154 mounted in a generally linear manner. The Hall effect sensors 154 are physically located within a sealed column within a hydraulic fluid reservoir (not shown). The controller block 150a is operatively connected to an oil temperature sensor 158 located within a first column (not shown). The controller block 150a is also connected to a leak warning driver 152 which drives perceptible indicia block 151. The perceptible indicia of such block 151 can include alarms, horns, buzzers, lights, or other indicia which will alert an operator that a hydraulic fluid leak may be occurring. Finally, leak detector controller block 150a is connected to the air valve driver 159 which selectively activates the air valve solenoid 160 to either release or replenish air in order to normalize the air pressure within the reservoir to the external ambient atmosphere. The solenoid 160 is illustrated in FIG. 4 as being connected to the reservoir 161 by double lines to better illustrate a fluid communication between the ambient external environment and the reservoir 161. Those skilled in the art, however, will appreciate that while the air valve solenoid 160 acts to change the pressure within the reservoir, the first end of the column is always maintained open to the atmosphere via a vent.

Float 156 floats on the fluid level within the float chamber (not shown). Float block 156 includes a magnet 155 located thereon which interacts with the Hall effect sensors 154 in a known manner. Float 156 moves in a vertical direction as illustrated by the line designated 157 such that at least one Hall effect sensor is selectively activated based on the level of the float within the float chamber. It will be appreciated that the use of a generally linear row of sensors 154 provides a digital representation of the level of hydraulic fluid within the column. By sensing one or two sensors, the height of the fluid in the column can be measured to an accuracy of one-half of the sensor spacing. In the preferred embodiment, thirteen (13) sensors are used $\frac{4}{10}$ inch apart. Accordingly, a $\frac{2}{10}$ inch resolution is achieved. The magnet is sized and configured such that if the magnet is located between two sensors, then both are activated. Also in the preferred embodiment, at least one sensor must always be turned on, otherwise a fault condition is signaled. It will be appreciated that for greater accuracy, a second row of sensors might be provided with an offset from the first row.

Primary electronic control unit block 100 is illustrated as providing information via bus 250. As noted above, this may be done to provide additional information to the leak detector controller 150a (e.g., such as instructions regarding devices currently in use within the hydraulic environment). Additionally, the leak detector controller block 150a can pass error and/or other data messages (e.g., oil level and temperature information) back to the primary controller 100. Such message sharing implements a multiple controller area network ("CAN") environment.

In the preferred embodiment, the microprocessor of the secondary controller 150a is an Intel MCS-96 family microcontroller. In operation, the secondary controller 150a determines the level of oil in the column by determining the position of the float 156 (via the interaction of the magnets 155 and sensors 154), determines the volume of oil, determines the temperature of the oil, determines if there is a leak, signals via an alarm if a leak occurs, allows column height to be reset if the oil is either too low or too high, communicates information to the CAN data bus 250, and receives machine state information (i.e., information which includes cylinder oil usage, etc.) from the CAN network if available.

Main Program Operation 200

Having now described the functional blocks and general operation of the primary controller 100 and an exemplary secondary controller 150 (e.g., leak detector controller 150a), a discussion will be presented describing the logic flow of the primary and secondary controllers which is implemented in programming steps acted on by the microprocessors of the ECU's in order to implement the CAN. It will be appreciated that the messages communicated between the ECU's are sent by the CAN devices 117 over bus 250 (best seen in FIG. 2).

It will also be appreciated by those skilled in the art that FIG. 2 illustrates a bus 250 to which primary controller 100 and secondary ECU's 150a, 150b, 150c and 150d are connected. As described above, the leak detector controller 150a is provided as an exemplary secondary controller. However, any number of different secondary controllers may be connected to the bus 250. Accordingly, while several additional secondary ECU's 150a, 150b, 150c and 150d are illustrated, for clarity the secondary ECU's will hereinafter be collectively referred to as "secondary ECU's 150" or if the context indicates a single secondary controller as "secondary ECU 150" (unless specifically designated otherwise).

The secondary ECU's 150 may control functions such as hydraulic cylinders, hydraulic motors, the operation of the primary mover of the turf mower 10 (e.g., a gasoline or diesel engine), etc. Other secondary ECU's 150 may comprise display devices, controls and other input devices (e.g., a keyboard or keypad), and other smart devices including engine controllers and GPS devices. It will also be appreciated that any number of secondary ECU's 150 may be connected to bus 250 to implement various functions of the turf mower 10.

Figure 5:
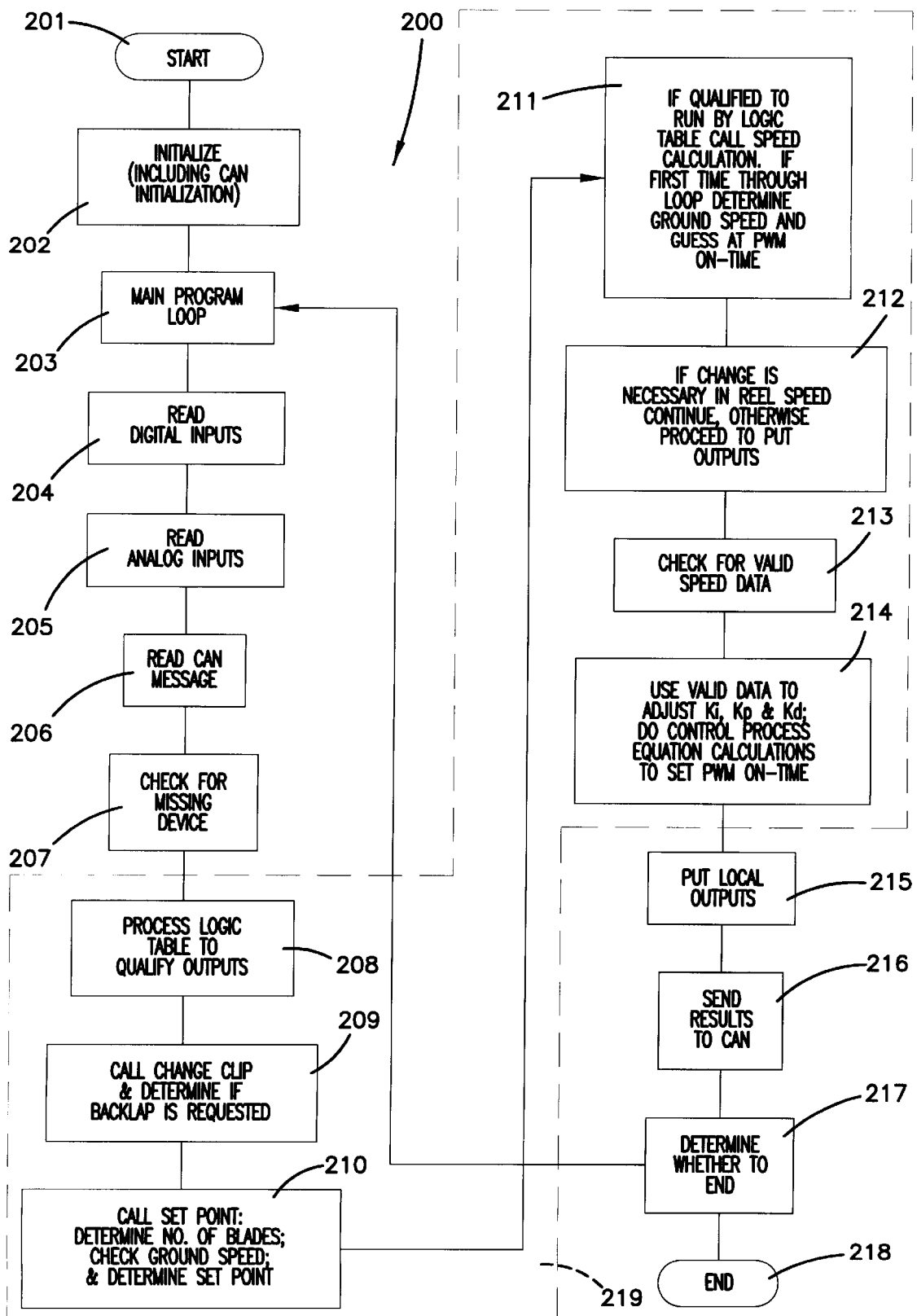
FIG. 5 is a logic flow diagram of a software program exemplary of the processing steps of the primary controller 100.

In the preferred embodiment, the primary controller 100 operates a main program loop 200 illustrated in FIG. 5 generally by the designation 200. A portion of the program, designated by 219, optimizes the clip. However, such program portion 219 is exemplary, and those of skill in the art will appreciate that the main program flow may take on a number of different control and/or monitoring functions.

As noted above, the primary controller 100 includes logic means which comprises a microprocessor 102. The processor 102 sequentially polls the inputs, including the asynchronous interrupts. The program logic may be resident in the processor 102 or stored in nonvolatile memory block 107 or RAM 108 as illustrated in FIG. 3. The logic flow diagram 200 illustrates the various steps to initialize the CAN, send and receive messages and poll for non-responding devices. Additionally, the logic flow diagram 200 illustrates (at the designation 219 the steps taken to analyze the logical status of the various inputs and provide outputs to drive the reels at their proper speed relative to the ground speed.

Although the processor 102 (and secondary ECU's 150) will be characterized as "proceeding" from logical block to logical block while describing the operation of the program logic, those skilled in the art will appreciate that programming steps are being acted on by processor 102.

In operation, processor 102 starts at block 201 and proceeds to initialize at block 202. These functions include initializing the microprocessor, serial ports, input structures, output structures, high speed input devices, and high speed output devices (i.e., pulse width modulators). The CAN (controller area network) is also initialized by both the primary and secondary ECU's. The CAN initialization routines are described in more detail below in connection with FIGS. 6a and 6b.

At block 203, the processor 102 begins the main program loop. The first step is to proceed to block 204 where the digital inputs are read. Next, at block 205, various analog inputs are read. By way of example, the various inputs are read to determine whether it is appropriate to allow the prime mover fuel solenoid to turn on (i.e., in a diesel system). However, those skilled in the art will appreciate that in a gasoline system an ignition coil may be ungrounded. An interlocking system of inputs are decoded below at block 208 to actively implement various logical features of the turf maintenance vehicle 10. For example, if an operator presence switch indicates no operator, then the processor 102 may not allow engagement of the transmission. It will be appreciated that the order of reading the analog and digital inputs (and the inputs themselves) may be modified for other applications and requirements.

Figure 7:
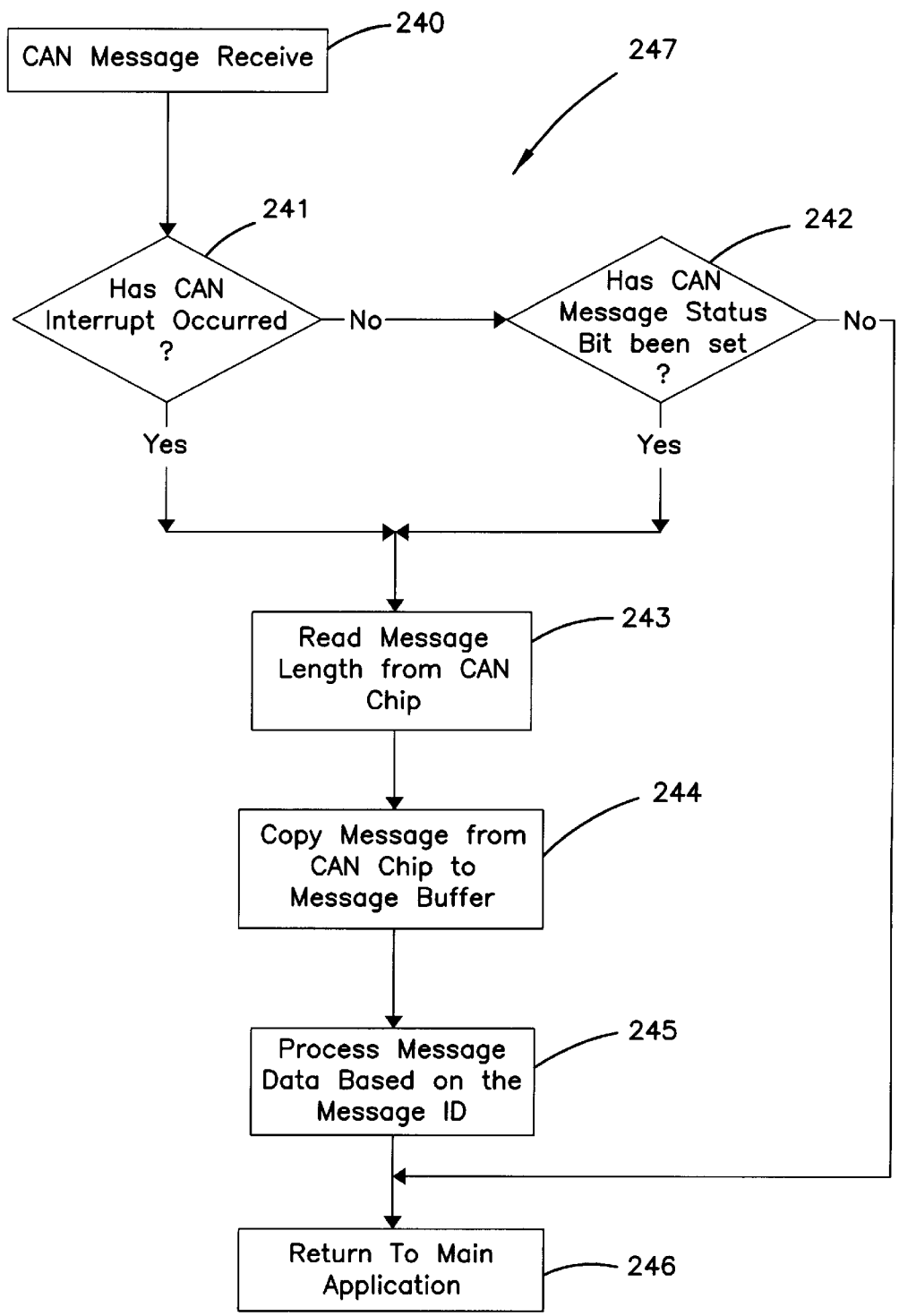
FIG. 7 is a logic flow diagram of a software program implementing a CAN message receive routine of the present invention.

Proceeding to block 206, the processor 102 determines if a CAN message interrupt has occurred. If so, the CAN message receive routine is implemented. The logic flow for this routine is best seen in FIG. 7 at 247.

Figure 8A:
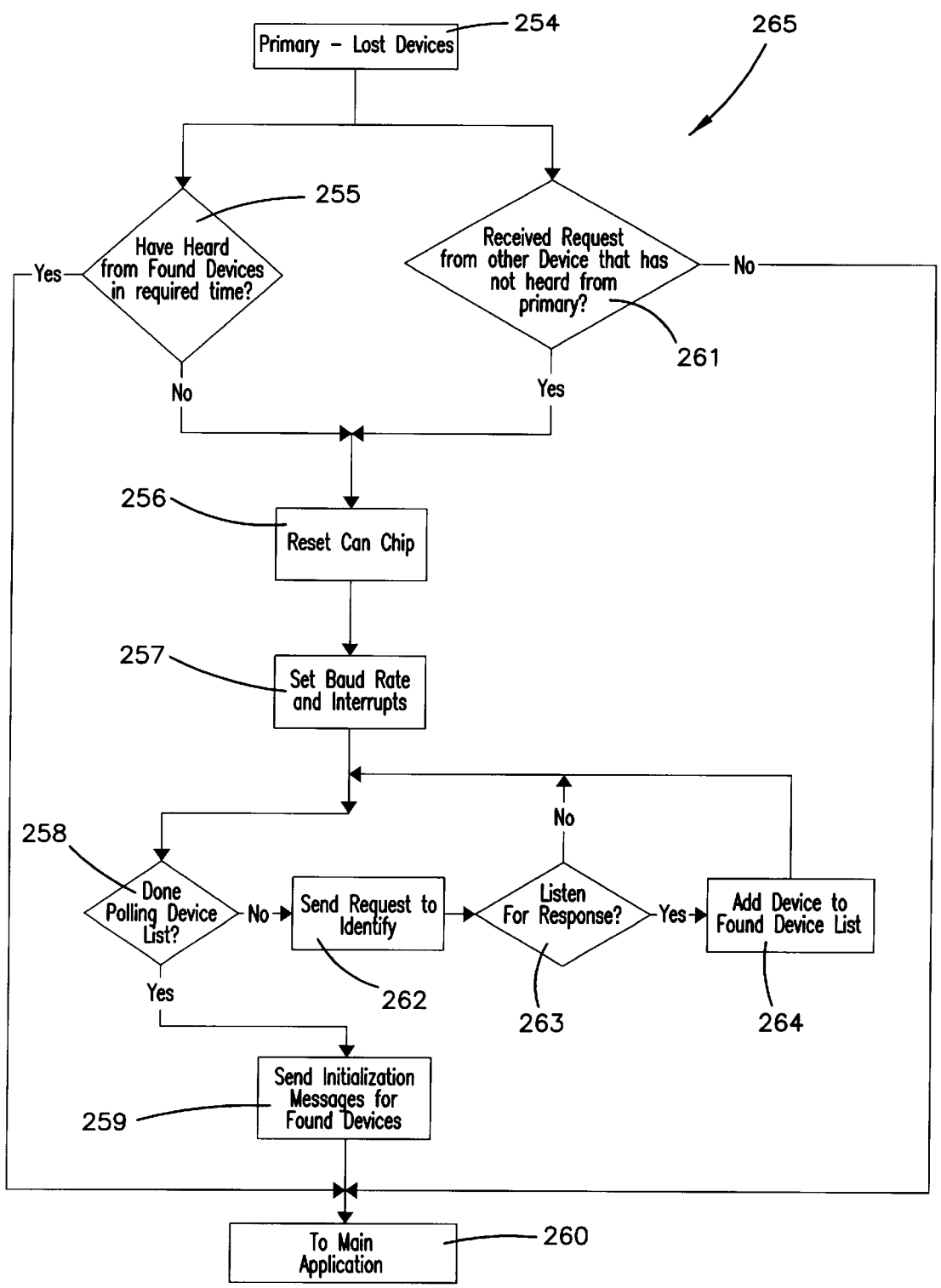

Next, at block 207, the processor 102 checks for missing devices. As described further below, during the CAN initialization, a list of devices is built by the primary controller 100. In the event that a message is not received at block 206, then the lost devices routine shown in FIG. 8a is preferably implemented. Similarly, if a secondary ECU 150 etc. does not "hear" from the other devices connected to the bus 250, then a lost devices routine designated by 269 in FIG. 8b is preferably run by the secondary ECU 150. The logic flow diagrams of FIGS. 8a and 8b will be described in further detail below.

Processor 102 then proceeds to block 208 where, as noted above, a logic table is processed based upon the decoded inputs. First at block 208, output states are qualified based upon the various input states. For example, the transmission speed may be enabled if the operator has adjusted the controls 20 to a position other than neutral. At block 209 the change clip subroutine is run, first determining whether back lap of the reels is desired by the operator. If back lap is requested, the height of cut selector 114 as set by the operator is determined and the set point is found by looking up the value in a table stored in memory.

If back lap is not requested, the processor 102 proceeds to block 210 and the set point subroutine is called. If 5 blade reels are being utilized, the ground speed is determined by interrupt driven routines based on high speed input devices measuring the rotation of a transmission gear driving wheels 16. Thus, the actual ground speed of the vehicle 10 may be used to vary the reel speed and optimize the clip. Given the determined ground speed, the set point is determined in accordance with a control equation.

If a 5 blade reel is not being used, then the ground speed is determined via the high speed input interrupt driven routine and the set point is determined based on the 8 blade information.

Moving to block 211, processor 102 determines whether the reels are qualified to run by the logic table. Next, the speed calculation subroutine is called to determine the proper reel speed given the HOC and ground speed. Processor 102 then proceeds to block 212 where it is determined whether a change in the reel speed is necessary. If no change is necessary, then the high speed output does not need to be changed and the processor 102 proceeds to block 215. However, if a change is necessary, then processor 102 proceeds to block 213 to check for valid speed data (i.e., the data is invalid if it is too old or is zero). If the speed data is not valid then it is assumed that the reels have stopped and the processor 102 increases the duty cycle to the hydraulic flow control valves (not shown) which control the flow of hydraulic fluid to motors 71 and 72. If the speed data is valid, processor 102 uses the data at block 214 to adjust the feedback control loop values. The reel speed is clamped between two predetermined values which in the preferred embodiment are 600 r.p.m. and 1800 r.p.m. However, those skilled in the art will appreciate that the foregoing numbers may vary and the clamping of the reel speeds may be determined by the speed required to cut the turf, to rid itself of the clippings and to avoid creating stragglers. Also, although the high end r.p.m. is limited by the primary controller 100, the system is also limited by the design of the hydraulic system mower 10.

The processor 102 then proceeds to block 215, where fault data from the outputs is determined, qualified outputs are turned on (if they have not faulted or been masked), and the diagnostic light is activated if any outputs have faulted.

Figure 9:
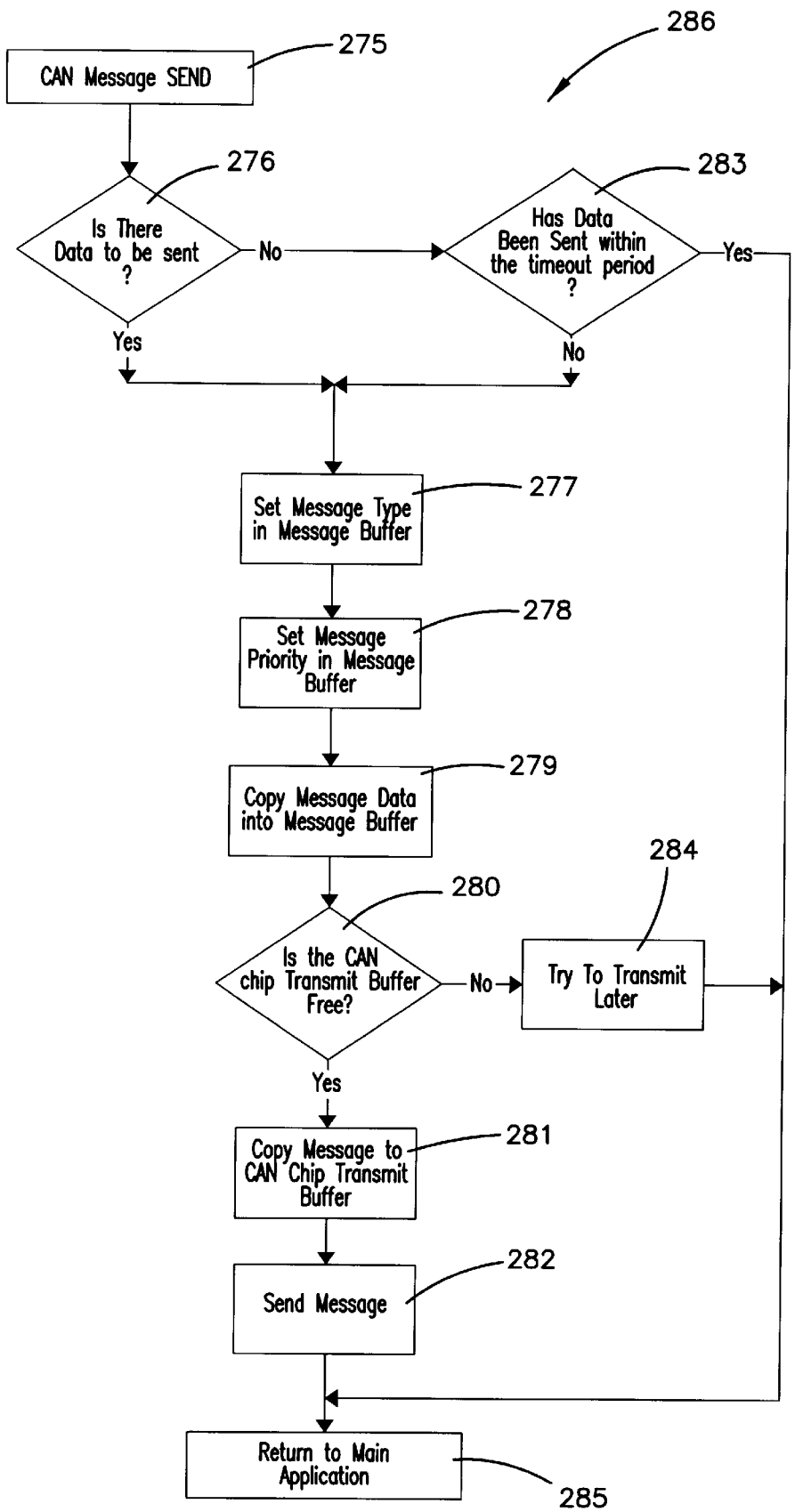
FIG. 9 is a logic flow diagram of a software program implementing a CAN message send routine of the present invention.

At block 216, processor 102 sends the results of the local outputs and inputs (read at blocks 204 and 205 over the CAN network. The logic flow diagram illustrating the send message routine is illustrated in FIG. 9 at 286 (discussed further below). If the operator has activated a control 20 to turn off the vehicle 10, then the processor 102 proceeds to block 218, otherwise the processor 102 proceeds to block 203 to begin the main program loop once again.

Multiple Controller Area Network 99 CAN Subroutines

Figure 6A:
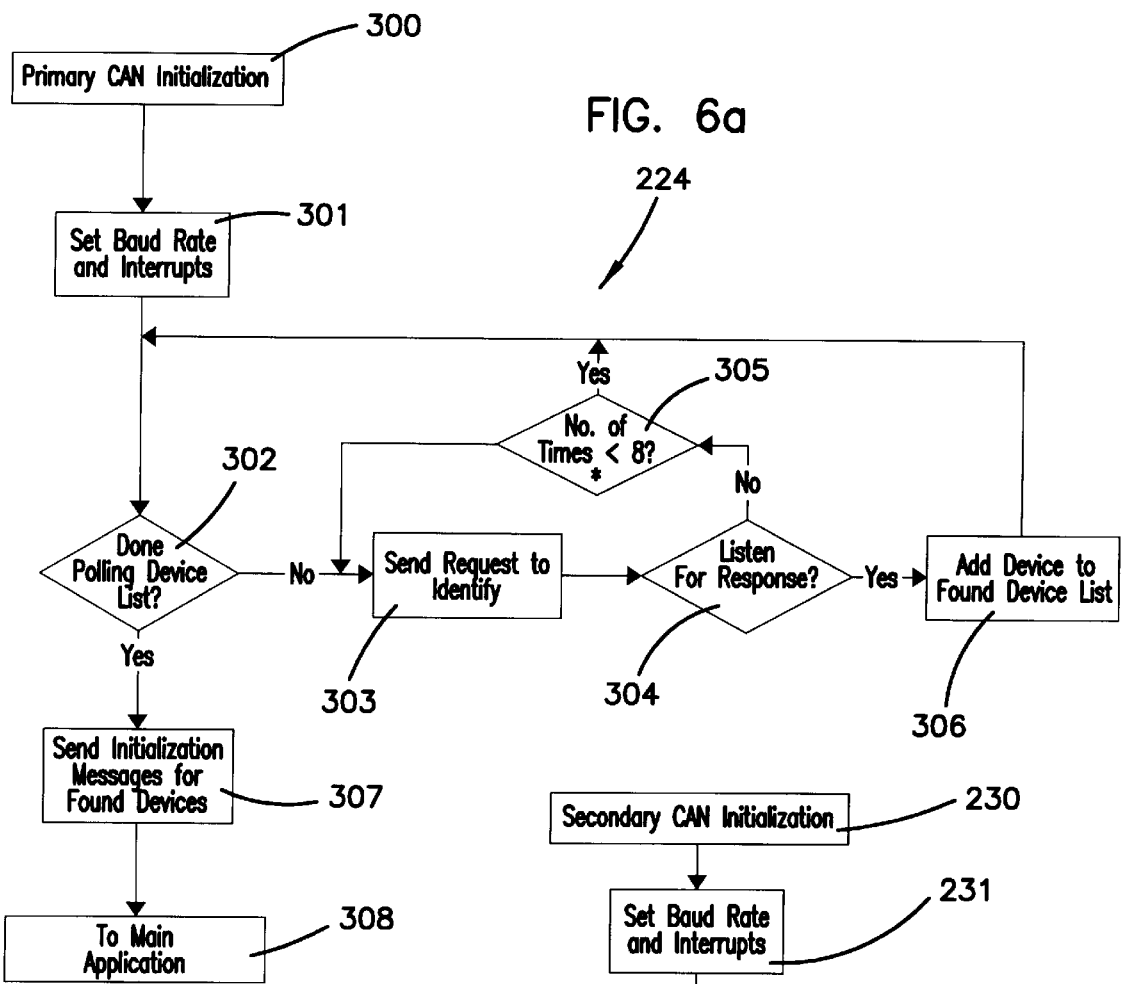
FIGS. 6a and 6b are logic flow diagrams of a software program implementing a CAN initialization routine of a primary controller 100 and a secondary ECU 150 respectively.
Figure 6B:
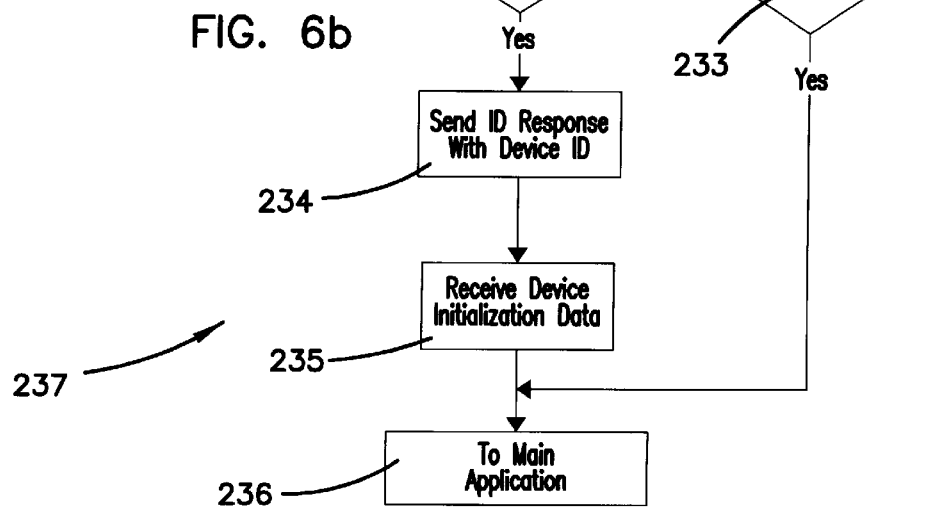

Now referring to FIGS. 6a and 6b, logic flow diagrams of the software programming steps which implement the initialization of a multiple controller area network 99 are illustrated.

In FIG. 6a the primary controller 100 performs the routine shown generally at the designation 224. When first initialized, processor 102 begins to implement the primary CAN initialization routine beginning at block 300. At block 301, the baud rate and interrupt sources are set. At block 302, processor 102 determines whether the polling device list has been completed. If not, processor 102 sends a request over the bus 250 (via CAN device 117 requesting the secondary ECU's 150 to identify themselves. At block 304, processor 102 listens for a response to its request. If a device responds, then the device is added to a found device list at block 306, and the processor 102 returns to block 302 where another request is sent at block 303 and a response is again listened for at block 304.

If no response is received at block 304, then processor 102 proceeds to block 305 to increment the counter, returns to block 303 to repeat the request for the device to identify itself. This sequence/loop of blocks 303, 304 and 305 is preferably repeated eight times before moving on to the next device when building the polling device list. However, those skilled in the art will appreciate that other numbers of eliciting requests to identify messages might be transmitted.

Once the polling device list is completed at block 302, the processor 102 proceeds to block 307 to send initialization messages for the found devices in the polling device list. Processor 102 then returns at block 308 to the main application program.

The secondary ECU's 150 also utilize an initialization routine designated generally at 237. First, at block 230, the initialization routine begins. At block 231, the baud rate and interrupts are set, while at block 232 a CAN ID request is listened for (e.g., the request to identify sent by the primary controller 100 at block 218 of FIG. 6a). If no ID request is received, the secondary ECU 150 proceeds to block 233 to determine whether an initialization time out has expired. If not, the secondary ECU 150 returns to block 232. However, if the initialization time out has expired, then the secondary ECU 150 proceeds to return to its main application at block 236.

In the event that a CAN ID request is received, the secondary ECU 150 continues to block 234 and sends an ID response with a device identification. This provides the primary controller 100 with information that the secondary ECU 150 is present and information on the nature and type of the secondary ECU 150. Next at block 235, the secondary ECU 150 receives the device initialization data sent by the primary controller 100 (at block 222 of FIG. 6a). After receiving the device initialization data, the secondary ECU 150 continues to block 236 and returns to its main program.

Turning now to FIG. 7, the CAN message receive logic steps are illustrated and designated generally at 247. These steps are implemented by both the primary controller 100 and secondary ECU's 150. Since both types of controllers implement a similar routine, the logic flow will be referred to as simply being acted on by an "ECU".

At block 240, the logic flow starts and continues to block 241. If a CAN interrupt has occurred, the ECU proceeds to block 243 to read the message length from the CAN device 117. The message is then copied from the CAN device 117 to the message buffer of the ECU at block 244. The message is then processed based on the message ID at block 245. The ECU returns to its respective main application at block 246.

If a CAN interrupt has not occurred at block 241, the ECU continues to block 242 to determine whether the CAN message status bit has been set. This is done so that data, which did not properly set the interrupt, is not overwritten. If the CAN message status bit has not been set, then the ECU continues to block 246. However, if the message status bit has been set, then the message is read at block 243. These steps are performed to ensure that all messages are processed.

FIGS. 8a and 8b respectively illustrate the primary controller 100 and secondary ECU 150 programming logic to poll for "lost" devices on the bus 250. While these programming steps are not essential, the steps increase the robustness of the present invention. Turning first to FIG. 8a, the logic flow diagram is illustrated generally at 265. The primary controller 100 begins at block 254 and the moves to block 255 to determine whether it has "heard" from devices previously found and added to the polling device list in the required time. If yes, it returns to the main application at block 260.

However, if the primary controller 100 has not heard from (e.g., received messages or requests) the found devices at block 255, then it moves to block 256 and resets the CAN device 117. At block 256 initialization of the bus 250 occurs and at block 258 the polling device list is rebuilt by sending requests to identify (at block 266, listening for responses (at block 263, and adding found devices to the polling device list (at block 264. As described above in connection with FIG. 6a, the polling device list is built by repeatedly proceeding through blocks 262, 263 and 264 until all of the devices which are connected to the bus 250 are determined. After the polling device list is constructed, then the primary controller 100 moves to block 259 to send initialization messages for found devices. The primary controller 100 then returns to the main program at block 260.

The bus 250 may also be reset by the primary controller 100 upon receiving a request from a secondary ECU 150 that has not heard from the primary controller 100. In this instance, the lost devices routine is started at block 254 and proceeds to block 261. If a request is received from another device that has not heard from the primary controller 100, the resetting, initialization, and polling steps are then performed before returning to the main program at block 260.

FIG. 8b illustrates the logical steps acted on by the secondary ECU's 150 upon the occurrence of a lost device. These steps are shown generally at 270. Beginning at block 266, the secondary ECU proceeds to block 267 to determine whether the secondary ECU 150 has received messages from other devices. If no messages were received, then a send ID request is sent over the bus 250 (as described in FIG. 9). However, if other devices have been heard from at block 267, then the secondary ECU 150 returns to its main program at block 269.

Turning now to FIG. 9, the CAN message send logic flow is shown generally at 286. Since both the primary controller 100 and secondary ECU 150 use similar steps in the preferred embodiment, once again the processor implementing the programming steps will be referred to simply as the "ECU".

The ECU starts the logic flow generally at block 275 and continues to block 276. If there is data to be sent at block 276, then the ECU proceeds to block 277. The message is built in three segments including the "message type" at block 277, the "message priority" at block 278, and the "message data" at block 279. Once these three portions of the message buffer are filled, the ECU proceeds to block 280 to determine if the CAN device 117 transmit buffer is free. If it is free, then the message is transmitted to the buffer at block 281 and the message is sent over the bus 250 at block 282. The ECU then returns to its main application at block 285. If the CAN transmit buffer is not free at block 280, then the ECU tries to transmit information later at block 284 (e.g., the ECU returns to the main application at block 285 and attempts to transmit the message again during the next pass through the program loop).

Further, if there is no data to be sent at block 276, then the ECU determines whether data has been sent within a time-out period at block 283. If yes, then the ECU returns to its main application at block 285. However, if no data has been sent within the time-out period (at block 283, then the old data is resent by moving through blocks 277 through 282.

Table 1 below. The example illustrates the process of broadcasting the message containing the state of the inputs of the primary controller 100 on the CAN bus 250. This event is triggered by a change in one of the inputs to the primary controller 100. When this change is detected, the sequence of events to send data on the CAN bus is initiated as set forth in the following Table 1.

TABLE 1

| | | | | |
|---|---|---|---|---|
| 1. | Is there Data to be sent? (Block 276) | Inputs have changed. Send input data. | | |
| 2. | Set Message type: (Block 277) | Message Buffer: XX<u>001000</u> XXXXXXXX | 0000XXXX XXXXXXXX | \| XXXXXXXX |
| 3. | Set Message Priority: (Block 278) | Message Buffer: <u>01</u>001000 XXXXXXXX | 0000XXXX XXXXXXXX | \| XXXXXXXX |
| 4. | Set Message Length: | 01001000 XXXXXXXX | 0000<u>0011</u> XXXXXXXX | \| XXXXXXXX |
| 5. | Set Message Data: (Block 279) | Message Buffer: 01001000 <u>DDDDDDDD</u> | 00000011 <u>DDDDDDDD</u> | \| <u>DDDDDDDD</u> |
| 6. | Check bit 3 of CAN Chip Status Register to see if the CAN Transmit Buffer is available (Block 280). | | | |
| 7. | If available, copy Message Buffer into CAN Chip Transmit Buffer (Block 281). | | | |
| 8. | Set Bit 0 of CAN Chip Command Register to send data (Block 282). | | | |
| 9. | Return to main processing loop of application program (Block 285). | | | |

Note: First two bytes of the message are header bytes including: First byte - priority (2 bits), message ID (6 bits); and second byte - message ID (3 bits), data frame type (1 bit), message length (4 bits). In this application, the data is the status of the various inputs.

This is done so that the receiving ECU's will receive data within a certain period and do not begin to look for lost devices.

Message Structure and Working Example

In operation, primary controller 100 reads local inputs from the configured devices. In the preferred embodiment, the inputs are comprised of data which is transmitted if the local inputs have changed or if it has been at least one second since the state of the inputs were made available on the bus 250. The remote data is then passed into the main program (e.g., the logic flow illustrated in FIG. 5) as if it were local data. At this point, a state variable may be established which indicates how a logic table is processed. This allows the secondary ECU's 150 to avoid processing a similar set of state conditions again.

For example, a secondary ECU 150 may be utilized to engage one or more cutting reels 48. However, such reel 48 should preferably be engaged only if the primary controller 100 has qualified the reels to begin a cutting operation (e.g., operator presence switch is in its proper position, among others).

If data is not received by the primary controller 100, the primary controller 100 polls the configured device(s) to determine whether it is still operative and connected to the bus 250. If the configured device(s) responds, primary controller 100 continues to transmit and receive data. However, if the configured device(s) does not respond, then the primary controller 100 generates a signal to diagnostic lamp 116. The secondary ECU's 150 utilize a similar logic flow to implement the present invention.

An example of building a message to be sent over the CAN will next be presented in connection with FIG. 9 and In the above example, the message was three bytes long. However, other message lengths may be utilized. In the preferred embodiment, message lengths from 0 to 8 bytes are allowed.

In the preferred embodiment, the information is broadcast periodically even if it is not changed (at a frequency that is commensurate with the type or criticality of the data). This is done to ensure that a message is available and that the information is current. However, it should be apparent that the information may be transmitted only when it changes. Further, while the main control loop 200 does not currently acknowledge that a message has been received, each controller is programmed to receive information. Therefore, if no messages are received, then it takes action to reset the CAN chip (e.g., block 117 and flash a diagnostic lamp (e.g., block 116). In the event that messages are again received, then the error indication is cleared. In the preferred embodiment, the controller area network chips (CAN chips) utilized are SIGNETICS 82C200 chips. These chips are manufactured by Philips Semiconductors (Signetics Co.) of Sunnyvale, Calif.

As noted above, in the current implementation, messages are broadcast upon change or periodically. This periodic broadcast of messages allows the system to determine health of the bus. A second time out exists to allow the network to determine the health of the system. If a device drops off the bus 250, the device will not provide its periodic broadcast. This will cause the time out to be reached and the loss of the device will be identified. The rate of broadcast in the preferred embodiment is set forth in the following Table 2.

TABLE 2

| Message Type | Broadcast Rate | Time out |
| --- | --- | --- |
| Primary Controller Input Data | 1 Second | 1.5 Seconds |
| Primary Controller Output Data | 1 Second | 1.5 Seconds |
| Secondary Controller Input Data | 1 Second | 1.5 Seconds |
| Secondary Controller Output Data | 1 Second | 1.5 Seconds |
| Leak Detector Data | 25 Seconds | 75 Seconds |

In the preferred embodiment, the broadcast rate is chosen based on the relative importance of the message data to the operation of the vehicle 10. It will be appreciated, however, that the broadcast rates described in Table 2 do not imply that an additional device would use similar broadcast rates.

The hardware of the CAN device 117 is addressed as memory by the processor 102 and the secondary ECU's 150. The hardware includes a number of registers which act to control, provide status information, and contain the message to be transmitted and the messages which have been received. When the CAN device 117 is initialized, the software establishes the baud rate of the messages to be transmitted and received.

When a message is to be transmitted, a status register is checked to make certain the transmit buffer is available. When available, the message ID, the number of bytes and the message to be transmitted are loaded into the transmit buffer. A bit on the control register is then toggled and the message is sent on the bus.

To receive a message, the CAN device 117 can be told to generate an interrupt when a message is successfully received or the application can poll a status bit. When the message is available, the message is copied out of CAN chip memory, the receive buffer is released for new messages and the message is processed by the application.

It will be appreciated that while the preferred embodiment has been described in connection with a turf maintenance vehicle 10, the present invention might also be used with other turf maintenance devices and applications (such as tub grinders, irrigation controllers, utility vehicles, and aerators, among others). The term "turf maintenance system" is intended to include both turf maintenance vehicles 10 and such other devices and applications.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of networking a plurality of processors on a turf maintenance system, comprising the steps of:
   (a) connecting a primary controller on-board a turf maintenance system to one or more secondary controllers on-board the turf maintenance system via a bus, wherein the primary controller and the one or more secondary controllers each perform a different function on the turf maintenance system, and the primary controller controls the cutting clip;
   (b) polling the secondary controllers over the bus to determine if they are connected to the bus and operative;
   (c) determining if the secondary controllers respond; and
   (d) passing information between the primary and secondary controllers that respond.

2. The method of claim 1, further comprising the step of periodically repeating steps b, c and d.

3. A method of networking a plurality of processors on a turf maintenance system, comprising the steps of:
   (a) connecting a primary controller on-board a turf maintenance system to one or more secondary controllers on-board the turf maintenance system via a bus, wherein the primary controller and the one or more secondary controllers each perform a different function on the turf maintenance system, and wherein one of the one or more secondary controllers detects if a hydraulic fluid leak occurs;
   (b) polling the secondary controllers over the bus to determine if they are connected to the bus and operative;
   (c) determining if the secondary controllers respond; and
   (d) passing information between the primary and secondary controllers that respond.

4. The method of claim 3, further comprising the step of periodically repeating steps b, c and d.

5. A method of networking a plurality of processors on a turf maintenance system, comprising the steps of:
   (a) connecting a primary controller on-board a turf maintenance system to one or more secondary controllers on-board the turf maintenance system via a bus, wherein the primary controller and the one or more secondary controllers each perform a different function on the turf maintenance system, and the primary controller monitors the status of the transmission of the turf maintenance system;
   (b) polling the secondary controllers over the bus to determine if they are connected to the bus and operative;
   (c) determining if the secondary controllers respond; and
   (d) passing information between the primary and secondary controllers that respond.

6. The method of claim 5, further comprising the step of periodically repeating steps b, c and d.

7. A method of networking a plurality of processors on a turf maintenance system, comprising the steps of:
   (a) connecting a primary controller on-board a turf maintenance system to one or more secondary controllers on-board the turf maintenance system via a bus, wherein the primary controller and the one or more secondary controllers each perform a different function on the turf maintenance system, and the primary controller monitors the presence of an operator on the turf maintenance system;
   (b) polling the secondary controllers over the bus to determine if they are connected to the bus and operative;
   (c) determining if the secondary controllers respond; and
   (d) passing information between the primary and secondary controllers that respond.

8. The method of claim 7, further comprising the step of periodically repeating steps b, c and d.

9. A method of networking a plurality of processors on a turf maintenance system, comprising the steps of:
   (a) connecting a primary controller on-board a turf maintenance system to one or more secondary controllers on-board the turf maintenance system via a bus, wherein the primary controller and the one or more secondary controllers each perform a different function on the turf maintenance system, and the primary controller monitors a plurality of input parameters of the turf maintenance system, including the status of the transmission and the presence of an operator on the turf maintenance system, and wherein the primary controller controls the cutting clip;
- (b) polling the secondary controllers over the bus to determine if they are connected to the bus and operative;
- (c) determining if the secondary controllers respond; and
- (d) passing information between the primary and secondary controllers that respond.

10. The method of claim 9, further comprising the step of periodically repeating steps b, c and d.

11. An apparatus for a turf maintenance system for implementing a controller area network, comprising:
- (a) an electrical bus;
- (b) a primary controller device, operatively connected to the bus, for monitoring the status of the transmission of the turf maintenance system;
- (c) at least one secondary controller device, operatively connected to the bus, for controlling a process of the turf maintenance system; and
- (d) wherein the primary controller device includes:
  - (i) transmission means for passing information between the primary and secondary controller devices over the bus;
  - (ii) means for polling the secondary controllers to respond by transmitting an identification message over the bus to the primary controller; and
  - (iii) means for determining if the secondary controllers respond.

12. An apparatus for a turf maintenance system for implementing a controller area network, comprising:
- (a) an electrical bus;
- (b) a primary controller device, operatively connected to the bus, for monitoring the presence of an operator on the turf maintenance system;
- (c) at least one secondary controller device, operatively connected to the bus, for controlling a process of the turf maintenance system; and
- (d) wherein the primary controller device includes:
  - (i) transmission means for passing information between the primary and secondary controller devices over the bus;
  - (ii) means for polling the secondary controllers to respond by transmitting an identification message over the bus to the primary controller; and
  - (iii) means for determining if the secondary controllers respond.

13. An apparatus for a turf maintenance system for implementing a controller area network, comprising:
- (a) an electrical bus;
- (b) a primary controller device, operatively connected to the bus, for controlling the cutting clip;
- (c) at least one secondary controller device, operatively connected to the bus, for controlling a process of the turf maintenance system; and
- (d) wherein the primary controller device includes:
  - (i) transmission means for passing information between the primary and secondary controller devices over the bus;
  - (ii) means for polling the secondary controllers to respond by transmitting an identification message over the bus to the primary controller; and
  - (iii) means for determining if the secondary controllers respond.

14. An apparatus for a turf maintenance system for implementing a controller area network, comprising:
- (a) an electrical bus;
- (b) a primary controller device, operatively connected to the bus, for monitoring a plurality of input parameters of the turf maintenance system, including the status of the transmission and the presence of an operator on the turf maintenance system, and wherein the primary controller controls the cutting clip;
- (c) at least one secondary controller device, operatively connected to the bus, for controlling a process of the turf maintenance system; and
- (d) wherein the primary controller device includes:
  - (i) transmission means for passing information between the primary and secondary controller devices over the bus;
  - (ii) means for polling the secondary controllers to respond by transmitting an identification message over the bus to the primary controller; and
  - (iii) means for determining if the secondary controllers respond.

15. An apparatus for a turf maintenance system for implementing a controller area network, comprising:
- (a) an electrical bus;
- (b) a primary controller device, operatively connected to the bus, for controlling a first process of the turf maintenance system;
- (c) at least one secondary controller device, operatively connected to the bus, wherein at least one secondary controller device detects if a hydraulic fluid leak occurs on the turf maintenance system; and
- (d) wherein the primary controller device includes:
  - (i) transmission means for passing information between the primary and secondary controller devices over the bus;
  - (ii) means for polling the secondary controllers to respond by transmitting an identification message over the bus to the primary controller; and
  - (iii) means for determining if the secondary controllers respond.

* * * * *